3,580,923
RESOLUTION PROCESS
Thomas Leigh, Macclesfield, England, assignor to Imperial Chemical Industries Limited, London, England
No Drawing. Filed Jan. 22, 1969, Ser. No. 793,157
Claims priority, application Great Britain, Feb. 14, 1968, 7,321/68
Int. Cl. C07d 99/06
U.S. Cl. 260—306.7                4 Claims

ABSTRACT OF THE DISCLOSURE

A process for the resolution of racemic tetramisole, a known anthelmintic agent, to produce the (—)-tetramisole, by formation of a salt with an arenesulphonyl-L-pyroglutamic acid or a di-aroyl-(+)-tartaric acid.

---

This invention relates to a resolution process, and more particularly, it relates to a process for resolving racemic tetramisole, that is (+)-6-phenyl-2,3,5,6-tetrahydroimidazo[2,1-b]thiazole, into (+)-tetramisole and (—)-tetramisole, the latter being known to be a useful anthelmintic agent.

It is known that racemic tetramisole can be resolved into (+)-tetramisole and (—)-tetramisole by treating a solution of racemic tetramisole in chloroform with (+)- or (—)-10-camphorsulphonic acid, but the salt which separates first from the mixture does so in the form of a chloroform solvate which requires further treatment to remove the chloroform present.

An object of the present invention is to provide a process for the resolution of racemic tetramisole in which the (+)- or (—)-tetramisole salt of the resovling acid crystallises directly from an organic solvent reaction medium.

According to the invention there is provided a process for the resolution of racemic tetramisole which comprises treating a solution of racemic tetramisole in an organic solvent with an arenesulphonyl derivative of L-pyroglutamic acid, or a di-aroyl derivative of (+)-tartaric acid, the concentrations of the reactants in the organic solvent being such that the corresponding (+)- or (—)-tetramisole salt so formed crystallises directly from the organic solvent.

Particularly suitable arenesulphonyl derivatives of L-pyroglutamic acid are, for example, such derivatives in which the arene radical contains up to 10 carbon atoms, for example N-p-toluenesulphonyl-L-pyroglutamic acid, N-benzenesulphonyl-L-pyroglutamic acid and N-(naphthalene-1-sulphonyl)-L-pyroglutamic acid.

Particularly suitable di-aroyl derivatives of (+)-tartaric acid are, for example, such derivatives in which the aroyl radical contains up to 11 carbon atoms, and optionally bears one or two substituents selected from halogen atoms and alkyl and alkoxy radicals of 1–3 carbon atoms, for example chlorine atoms and methyl and methoxy radicals.

Thus examples of suitable di-aroyl derivatives of (+)-tartaric acid are the dibenzoyl, di-p-toluoyl, di-o-chlorobenzoyl, di-p-chlorobenzoyl, di-p-methoxybenzoyl and di-β-naphthoyl derivatives of (+)-tartaric acid, and of these, the preferred compounds are dibenzoyl-(+)-tartaric acid and di-p-toluoyl-(+)-tartaric acid.

It is to be understood that by a di-aroyl derivative of (+)-tartaric acid is meant a product obtained by acylating (+)-tartaric acid, and the nomenclature "di-aroyl-(+)-tartaric acid" means such a product. It is also to be understood that such a product is not necessarily dextrorotatory, and, in fact, dibenzoyl-(+)-tartaric acid and di-p-toluoyl-(+)-tartaric acid are laevorotatory, and may be alternatively named as (—)-O,O-dibenzoyl tartaric acid and (—)-O,O-di-p-toluoyltartaric acid.

The racemic tetramisole may be used in the form of the free base, or it may be used in the form of salt such as the hydrochloride which is soluble in the organic solvent and is thus capable of reacting to give a salt with the resolving acid.

The racemic tetramisole and the resolving acid may be used in equimolecular proportions, but a slight excess of the racemic tetramisole is generally used in order to improve the quality of the salt which first crystallises from the reaction medium. In certain instances, it is advantageous to have the racemic tetramisole and the resolving acid, such as N-benzenesulphonyl-L-pyroglutamic acid, present in the molecular ratio of about 2:1 whereas in others, where the resolving acid is a dibasic acid, it is advantageous to have the racemic tetramisole and the resolving acid, such as dibenzoyl-(+)-tartaric acid, present in the ratio of about 4:1.

In certain cases, variation in the molecular ratio of racemic tetramisole to resolving acid appears to determine whether a (+)-salt or a (—)-salt first separates from the reaction mixture. For example, a 4:1 molecular ratio of racemic tetramisole to di-p-toluoyl-(+)-tartaric acid provides the corresponding (—)-tetramisole salt as the initial product whereas a 2:1 molecular ratio of racemic tetramisole to di-p-toluoyl-(+)-tartaric acid provides the corresponding (+)-tetramisole salt as the initial product. The particular organic solvent or mixture of organic solvents used in the reaction medium will depend upon the relative solubilities of the racemic tetramisole, the resolving acid used and the corresponding (+)- or (—)-tetramisole salt which crystallises directly from the reaction medium. Suitable organic solvents may be chosen, for example, from ketones, alcohols, amides, esters, ethers and hydrocarbons provided that they are inert towards the racemic tetramisole and the resolving acid. Particularly suitable organic solvents are, for example, acetone, isopropanol and ethanol. When the organic solvent is water-miscible, small amounts of water may be added, and thus, for example, a suitable reaction medium may be isopropanol containing up to about 5% of water.

The reaction is generally carried out at ambient temperature (about 15–30° C.) and the (+)- or (—)-tetramisole salt of the resolving acid separates directly from the reaction mixture which may then be cooled in order to obtain an increased separation of this insoluble salt. By this means, there has been obtained (+)-tetramisole N-p-toluenesulphonyl-L-pyroglutamate, (—)-tetramisole N-p-toluenesulphonyl-L-pyroglutamate, (+)-tetramisole N-benzenesulphonyl-L-pyroglutamate, (—)-tetramisole N-(naphthalene-1-sulphonyl)-L-pyroglutamate, (—)-tetramisole dibenzoyl-(+)-tartrate, (—)-tetramisole di-p-toluoyl-(+)-tartrate and (+)-tetramisole di-p-toluoyl-(+)-tartrate.

These are novel salts of (+)- and (—)-tetramisole and are provided as a further feature of the invention.

The insoluble salt which first separates from the reaction mixture is removed and can then be converted into the corresponding free base, (+)- or (—)-tetramisole, or into a corresponding simple salt such as (+)- or (—)-tetramisole hydrochloride according to known procedures. For example, (—)-tetramisole dibenzoyl-(+)-tartrate can be suspended in a mixture of water and methylene chloride, and a base, such as sodium hydroxide, added to liberate (—)-tetramisole which can then be converted, if desired, to the corresponding hydrochloride.

After the insoluble salt which first separates from the reaction mixture is removed, the filtrate contains the more soluble salt of (+)- or (—)-tetramisole derived from the resolving acid used in the process. For example, when (+)-tetramisole N-p-toluenesulphonyl-L-pyroglutamate has been removed from the reaction mixture, the residual filtrate contains (—)-tetramisole N-p-toluenesulphonyl-L-pyroglutamate, and this can be isolated as such by allowing the filtrate to crystallise or by removing the organic solvent used in the reaction. Alternatively, the filtrate can be suitably treated to provide the free base, (—)-tetramisole, or it can be treated, for example with hydrogen chloride or a solution of hydrogen chloride in acetone or isopropanol, to provide the correspondnig (—)-tetramisole hydrochloride.

Since the desired product is (—)-tetramisole, a preferred process is one in which the (—)-tetramisole salt of the resolving acid is the least soluble and so crystallises first from the organic solvent reaction medium. Suitable such resolving acids are N-(naphthalene-1-sulphonyl)-L-pyroglutamic acid, dibenzoyl-(+)-tartaric acid and di-p-toluoyl-(+)-tartaric acid.

Thus a preferred process for the resolution of racemic tetramisole comprises treating a solution of racemic tetramisole in an organic solvent, being acetone or ethanol, with a resolving acid, being dibenzoyl-(+)-tartaric acid or di-p-toluoyl-(+)-tartaric acid, such that the molar ratio of the tetramisole to the resolving acid is about 4:1 and the concentration of the reactants in the organic solvent is such that the (—)-tetramisole salt of the resolving acid crystallises directly from the organic solvent.

The (—)-tetramisole may be recovered by conventional methods either as such, or as a suitable salt, for example the hydrochloride, from the insoluble salt obtained from the above resolution process.

The invention is illustrated but not limited by the following examples.

EXAMPLE 1

To a solution of 10.2 g. (0.05 mol.) of racemic tetramisole in 80 cc. of acetone at ambient temperature are added 12.6 g. (0.045 mole) of N-p-toluenesulphonyl-L-pyroglutamic acid. The acid quickly dissolves and after a few minutes, crystallisation occurs. The reaction mixture is allowed to stand at ambient temperature for four hours, and is then kept at 5° C. for a further twelve hours. The mixture is filtered, and the solid residue is washed twice using 15 cc. of acetone each time. There is thus obtained the (+)-tetramisole salt of N-p-toluenesulphonyl-L-pyroglutamic acid, M.P. 132° C. This salt is suspended in a mixture of 10 cc. of water and 50 cc. of methylene chloride and there is added thereto, 30 cc. of 2 N aqueous sodium hydroxide. The methylene chloride solution is separated and is then washed with water, dried over anhydrous magnesium sulphate and evaporated to dryness. There is obtained (+)-tetramisole, M.P. 59–60° C., $[\alpha]_D^{25}$ (5%, $CHCl_3$) +77°. The (+)-tetramisole is dissolved in acetone, and the hydrochloride is precipitated by the addition of a solution of hydrogen chloride in isopropanol. There is thus obtained (+)-tetramisole hydrochloride of specific rotation $[\alpha]_D^{25}$ (5%, water) +112°.

The combined acetone filtrate and washings from the original reaction mixture are evaporated to dryness in vacuo. The residue is dissolved in 50 cc. of methylene chloride and the solution is stirred with 30 cc. of 2 N aqueous sodium hydroxide. The methylene chloride extract is separated and evaporated and there is obtained crude (—)-tetramisole of specific rotation $[\alpha]_D^{25}$ (5%, $CHCl_3$) —61°.

EXAMPLE 2

The procedure described in Example 1 is repeated except that the combined acetone filtrate and washings are treated with 10 cc. of a 10% solution of hydrogen chloride in isopropanol. The mixture is filtered and the solid residue is washed with actone. There is obtained crude (—)-tetramisole hydrochloride of specific rotation $[\alpha]_D^{25}$ (5%, water) —87°. This material contains approximately 15% of (+)-tetramisole hydrochloride and it can be purified by stirring with 20 cc. of 9% aqueous ethanol. The mixture is filtered, and the solid residue is washed with 5 cc. of anhydrous ethanol. The residue consists of 1.9 g. of racemic tetramisole $[\alpha]_D^{25}$ —4.8° (5%, water). The combined ethanol filtrate and washing is evaporated to dryness and there is obtained (—)-tetramisole hydrochloride with a specific rotation $[\alpha]_D^{25}$ —119.6° (5%, water).

EXAMPLE 3

To a solution of 8.2 g. (0.04 mol.) of racemic tetramisole in 50 cc. of acetone at ambient temperature are added 11.4 g. (0.04 mol.) of N-p-toluenesulphonyl-L-pyroglutamic acid. The reaction mixture is allowed to crystallise according to the procedure as described in Example 1. The mixture is filtered, and the solid residue is washed with 30 cc. of acetone and it is then treated according to the procedure of Example 1. There is thus obtained (+)-tetramisole hydrochloride of specific rotation $[\alpha]_D^{25}$ +112° (5%, water).

The acetone filtrate and washings are combined and the solution is allowed to stand for four hours when the (—)-tetramisole salt of N-p-toluenesulfonyl-L-pyroglutamic acid crystallises. The mixture is filtered, the solid residue is washed with acetone and there is obtained the (—)-tetramisole salt of N-p-toluenesulfphonyl-L-pyroglutamic acid, M.P. 155° C. By treatment with methylene chloride and 2 N aqueous sodium hydroxide as described in Example 1, there is obtained (—)-tetramisole, M.P. 59–60° C. The (—)-tetramisole is dissolved in 20 cc. of acetone, adn the hydrochloride is precipitated by the addition of a 10% solution of hydrogen chloride in isopropanol. There is thus obtained (—)-tetramisole hydrochloride of specific rotation $[\alpha]_D^{25}$ —119° (5%, water).

EXAMPLE 4

The procedure described in Example 1 is repeated except that the 80 cc. of acetone are replaced by a mixture of 80 cc. of isopropanol and 4 cc. of water. The recoveries of (+)-tetramisole and (—)-tetramisole are similar to those obtained in Example 1.

EXAMPLE 5

To a solution of 0.8 g. (0.0039 mol.) of racemic tetramisole in 10 cc. of acetone at ambient temperature is added 0.52 g. (0.0019 mol.) of N-benzenesulphonyl-L-pyroglutamic acid. The acid dissolves and crystallisation occurs during three hours at ambient temperature. The mixture is filtered, and the solid residue is washed with acetone. There is thus obtained the (+)-tetramisole salt of N-benzenesulphonyl-L-pyroglutamic acid, M.P. 184° C. The salt is treated as described in Example 1 using aqueous methylene chloride and aqueous sodium hydroxide, and there is obtained (+)-tetramisole hydrochloride $[\alpha]_D^{25}$ (5%, water) +112°.

The acetone filtrate and washings are combined and treated according to the procedure as described in Example 2. There is obtained (—)-tetramisole hydrochloride of specific rotation $[\alpha]_D^{25}$ (5%, water) —119°.

EXAMPLE 6

To a solution of 0.8 g. (0.0039 mol.) of racemic tetramisole in 3 cc. of acetone at ambient temperature are added 1.1 g. (0.0033 mol.) of N-(naphthalene-1-sulphonyl)-L-pyroglutamic acid. The reaction mixture is allowed to stand at ambient temperature for twelve hours. The mixture is filtered and the solid residue is washed with acetone. There is thus obtained the (—)-tetramisole salt of N-(naphthalene-1-sulphonyl)-L-pyroglutamic acid, M.P. 152° C. The salt is treated as described in Example 1 and there is obtained (—)-tetramisole hydrochloride, $[\alpha]_D^{25}$ (5%, water) —103°.

The N-(naphthalene-1-sulphonyl)-L-pyroglutamic acid used in the above example may be prepared as follows:

A solution of 5.8 g. of naphthalene-1-sulphonyl chloride in 25 cc. of acetone is slowly added to a stirred solution of 9.0 g. of disodium glutamate in 25 cc. of water at 45° C. and during this addition the pH is maintained between 10 and 11 by the addition of aqueous sodium hydroxide. The acetone is then removed by distillation, and concentrated aqueous hydrochloric acid is added to the residue until the pH is 2.0. An oil is precipitated which slowly solidifies. The mixture is filtered and the solid residue is crystallised from water to provide N-(naphthalene-1-sulphonyl)-L-glutamic acid, M.P. 88° C. A mixture of 10 g. of N-(naphthalene-1-sulphonyl)-L-glutamic acid and 15 cc. of thionyl chloride is stirred at ambient temperature for twelve hours and then 20 cc. of ether are added and followed by light petroleum ether (B.P. 60–80° C.) until crystallisation begins. The mixture is filtered and the solid residue is crystallised from a mixture of ether and petroleum ether (B.P. 60–80° C.). There is obtained N-(naphthalene-1-sulphonyl)-L-pyroglutamic acid, M.P. 144° C.

EXAMPLE 7

To a solution of 4.0 g. (0.0196 mol) of racemic tetramisole in 15 cc. of ethanol is added a solution of 1.9 g. (0.005 mol.) of dibenzoyl-(+)-tartaric acid monohydrate in 5 cc. of ethanol at ambient temperature. After standing for thirty minutes the reaction mixture is filtered and the solid residue is washed with alcohol. There is thus obtained the (−)-tetramisole salt of dibenzoyl-(+)-tartaric acid, M.P. 152° C. In this salt, the molar ratio of (−)-tetramisole to dibenzoyl-(+)-tartaric acid is 2:1. By treatment with methylene chloride and 2 N aqeous sodium hydroxide according to the procedure as described in Example 1, there is obtained (−)-tetramisole, M.P. 60° C. The (−)-tetramisole is dissolved in 10 cc. of acetone and the hydrochloride is precipitated by the addition of an addition of an ethereal solution of hydrogen chloride. There is thus obtained (−)-tetramisole hydrochloride of specific rotation $[\alpha]_D^{25}$ (5% water) −119°.

EXAMPLE 8

The (−)-tetramisole salt of dibenzoyl-(+)-tartaric acid which is described in Example 7 may be converted directly to (−)-tetramisole by the following procedure. 2 grams of (−)-tetramisole dibenzoyl-(+)tartrate are suspended in 15 cc. of isopropanol and 4 cc. of a 10% solution of hydrogen chloride in isopropanol are added. The (−)-tetramisole dibenzoyl-(+)-tartrate quickly dissolves and after a few minutes (−)-tetramisole hydrochloride is precipitated. The mixture is filtered and the residue is washed with isopropanol. There is obtained (−)-tetramisole hydrochloride of $[\alpha]_D^{25}$ (5%, water) −119°.

EXAMPLE 9

To a solution of 4.0 g. (0.0196 mol.) of racemic tetramisole in 10 cc. of acetone is added a solution of 1.94 g. (0.005 mol.) of di-p-toluoyl-(+)-tartaric acid in 10 cc. of acetone at ambient temperature. After standing for two hours the reaction mixture is filtered and the solid residue is washed with acetone. There is obtained the (−)-tetramisole salt of di-p-toluoyl-(+)-tartaric acid, M.P. 118° C., in which the molar ratio of (−)-tetramisole to di-p-toluoyl-(+)-tartaric acid is 2:1. This salt is converted to (−)-tetramisole hydrochloride, $[\alpha]_D^{25}$ (5%, water) −119°, by the procedure described in Example 7.

EXAMPLE 10

To a solution of 4.0 g. of racemic tetramisole (0.0196 mol.) in 10 cc. of ethanol is added a solution of 3.86 g. of di-p-toluoyl-(+)-tartaric acid (0.01 mol.) in 10 cc. of ethanol. After standing for one hour the reaction mixture is filtered and the solid residue is washed with ethanol. There is obtained the (+)-tetramisole salt of di-p-toluoyl-(+)-tartaric acid, M.P. 116° C., in which the molar ratio of (+)-tetramisole to di-p-toluoyl-(+)-tartaric acid is 1:1. This salt is converted to (+)-tetramisole hydrochloride, $[\alpha]_D^{25}$ (5%, water) +112° by the procedure described in Example 7.

What I claim is:

1. In a process for the resolution of racemic tetramisole [(±) - 6-phenyl-2,3,5,6-tetrahydroimidazo[2,1-b] thiazole] into its optically active (+)- and (−)-isomers involving the steps of (1) adding an optically active isomer of an acid to a solution of racemic tetramisole, or a soluble salt thereof, in a reaction medium in which the concentration of the reactants is such that the less soluble salt of (+)- or (−)-tetramisole with the said optically active isomer of an acid crystallises directly from the reaction medium and (2) reacting the separated less soluble salt with a base to liberate the (+)- or (−)-tetramisole and isolating said liberated (+)- or (−)-tetramisole, the improvement whereby said optically active isomer of an acid is selected from the group consisting of an arenesulphonyl derivative of L-pyroglutamic acid in which the arene radical is selected from the group consisting of benzene, toluene and naphthalene, and a di-aroyl derivative of (+)-tartaric acid in which the aroyl radical is selected from the group consisting of benzoyl and toluoyl, and whereby the reaction medium is selected from the group consisting of acetone, isopropanol and ethanol and these three solvents each containing up to 5% of water.

2. A process according to claim 1 wherein when the optically active isomer of an acid is an arenesulphonyl derivative of L-pyroglutamic acid as defined in claim 1, the molecular ratio of tetramisole to acid is about 2:1.

3. A process according to claim 1 wherein when the optically active isomer of an acid is a di-aroyl derivative of (+)-tartaric acid as defined in claim 1, the molecular ratio of tetramisole to acid is about 4:1.

4. A process according to claim 1 wherein the optically active isomer of an acid is selected from di-benzoyl-(+)-tartaric acid and di-p-toluoyl-(+)-tartaric acid, the molar ratio of tetramisole to the acid is about 4:1, and the reaction medium is selected from acetone and ethanol.

References Cited

The Merck Index, eighth edition, 1968, p. 895.

ALEX MAZEL, Primary Examiner

R. J. GALLAGHER, Assistant Examiner

U.S. Cl. X.R.

260—326.3